United States Patent
Crucs

(10) Patent No.: US 8,248,533 B2
(45) Date of Patent: Aug. 21, 2012

(54) COORDINATED VIDEO FOR TELEVISION DISPLAY

(75) Inventor: Kevin M. Crucs, Copley, OH (US)

(73) Assignee: Crucs Holdings, LLC, Copley, OH (US)

( * ) Notice: Subject to any disclaimer, the term of this patent is extended or adjusted under 35 U.S.C. 154(b) by 463 days.

(21) Appl. No.: 12/621,772

(22) Filed: Nov. 19, 2009

(65) Prior Publication Data

US 2011/0115978 A1 May 19, 2011

(51) Int. Cl.
*H04N 9/74* (2006.01)
*H04N 5/455* (2006.01)

(52) U.S. Cl. .................. 348/584; 348/588; 348/564

(58) Field of Classification Search ................ 348/584, 348/588, 563, 564, 565, 569, 589, 598, 600; 345/629, 634, 635; *H04N 9/74, 9/76, 5/445, H04N 5/45, 5/50*
See application file for complete search history.

(56) References Cited

U.S. PATENT DOCUMENTS

| | | | |
|---|---|---|---|
| 6,020,931 A * | 2/2000 | Bilbrey et al. | 348/584 |
| 6,097,441 A | 8/2000 | Allport | |
| 6,388,714 B1 | 5/2002 | Schein et al. | |
| 6,441,864 B1 * | 8/2002 | Minami et al. | 348/584 |
| 7,649,571 B2 * | 1/2010 | Staker et al. | 348/584 |
| 2008/0098450 A1 | 4/2008 | Wu et al. | |

FOREIGN PATENT DOCUMENTS

| | | |
|---|---|---|
| EP | 2068559 A2 | 6/2009 |
| JP | 9074528 A | 3/1997 |
| JP | 11027599 A | 1/1999 |
| JP | 2002-507344 A | 3/2002 |
| WO | 9934599 A1 | 7/1999 |
| WO | 2008048255 A1 | 4/2008 |

* cited by examiner

*Primary Examiner* — Sherrie Hsia
(74) *Attorney, Agent, or Firm* — Hahn Loeser & Parks LLP

(57) ABSTRACT

Apparatus and methods for generating coordinated video content for display. The apparatus takes video signals from independent sources and allows a user to select portions of the video signals, corresponding to desired portions of video content to be displayed, and combines those video signal portions into a single composite video signal. The composite video signal may be displayed, for example, on a television screen showing the desired portions of video content.

20 Claims, 11 Drawing Sheets

COORDINATED VIDEO FOR TELEVISION DISPLAY

TECHNICAL FIELD

Certain embodiments of the present invention relate to displaying video. More particularly, certain embodiments relate to displaying video from a standard television source and video from at least one independent auxiliary source on a same television screen as a single composite video.

BACKGROUND

Some television systems incorporate two or more displays or screens to display video content from multiple sources. A set top box operatively connected to such a television system may receive signals, having video, from two or more sources and route the video from each of those sources to separate displays of the television system. In such television systems, the size and shape of the displays are fixed and, therefore, the manner in which any particular video content from any particular source can be displayed is limited. Other television systems combine two video contents, from a same source (e.g., a television receiver) into a single display (e.g., a picture-in-picture display).

Further limitations and disadvantages of conventional, traditional, and proposed approaches will become apparent to one of skill in the art, through comparison of such approaches with the subject matter of the present application as set forth in the remainder of the present application with reference to the drawings.

SUMMARY

An embodiment of the present invention comprises an apparatus for generating coordinated video content for display. The apparatus includes means for receiving a first video signal having first video content from a first source and means for receiving a second video signal having second video content from a second source, where the second source is independent of the first source. The apparatus further includes means for selecting a portion of the first video signal corresponding to a desired portion of the first video content to be displayed, and means for selecting a portion of the second video signal corresponding to a desired portion of the second video content to be displayed. The apparatus also includes means for combining the selected portion of the first video signal and the selected portion of the second video signal into a first composite video signal. The apparatus may further include means for outputting the first composite video signal for display. The apparatus may also include means for receiving a third video signal having third video content from a third source, where the third source is independent of the first source and the second source. The apparatus may further include means for selecting a portion of the third video signal corresponding to a desired portion of the third video content to be displayed. The apparatus may also include means for combining the selected portion of the first video signal, the selected portion of the second video signal, and the selected portion of the third video signal into a second composite video signal. The apparatus may further include means for outputting the second composite video signal for display.

Another embodiment of the present invention comprises a method for generating coordinated video content for display. The method includes receiving a first video signal having first video content from a first source and receiving a second video signal having second video content from a second source, where the second source is independent of the first source. The method further includes selecting a portion of the first video signal corresponding to a desired portion of the first video content to be displayed, and selecting a portion of the second video signal corresponding to a desired portion of the second video content to be displayed. The method also includes combining the selected portion of the first video signal and the selected portion of the second video signal into a first composite video signal. The method may further include outputting the first composite video signal for display. The method may also include receiving a third video signal having third video content from a third source, where the third source is independent of the first source and the second source. The method may further include selecting a portion of the third video signal corresponding to a desired portion of the third video content to be displayed, and combining the selected portion of the first video signal, the selected portion of the second video signal, and the selected portion of the third video signal into a second composite video signal. The method may also include outputting the second composite video signal for display.

A further embodiment of the present invention comprises an apparatus for generating coordinated video content for display. The apparatus includes means for receiving a video modulated television carrier signal from a first source and means for stripping a first video signal having first video content from the video modulated television carrier signal. The apparatus further includes means for receiving a second video signal having second video content from a second source, where the second source is independent of the first source. The apparatus also includes means for selecting a portion of the first video signal corresponding to a desired portion of the first video content to be displayed, and means for selecting a portion of the second video signal corresponding to a desired portion of the second video content to be displayed. The apparatus further includes means for combining the selected portion of the first video signal and the selected portion of the second video signal into a first composite video signal. The apparatus may also include means for outputting the first composite video signal for display. The apparatus may further include means for receiving a third video signal having third video content from a third source, where the third source is independent of the first source and the second source. The apparatus may also include means for selecting a portion of the third video signal corresponding to a desired portion of the third video content to be displayed, and means for combining the selected portion of the first video signal, the selected portion of the second video signal, and the selected portion of the third video signal into a second composite video signal. The apparatus may further include means for outputting the second composite video signal for display. The apparatus may be a television set further comprising means for displaying the first composite video signal and/or the second composite video signal.

Another embodiment of the present invention comprises a method for generating coordinated video content for display. The method includes receiving a video modulated television carrier signal from a first source and stripping a first video signal having first video content from the video modulated television carrier signal. The method further includes receiving a second video signal having second video content from a second source, where the second source is independent of the first source. The method also includes selecting a portion of the first video signal corresponding to a desired portion of the first video content to be displayed, and selecting a portion of the second video signal corresponding to a desired portion of the second video content to be displayed. The method further includes combining the selected portion of the first video signal and the selected portion of the second video signal into a first composite video signal. The method may also include outputting the first composite video signal for display. The method may further include displaying the first composite video signal. The method may also include receiving a third video signal having third video content from a third source, where the third source is independent of the first source and the second source, and selecting a portion of the third video signal corresponding to a desired portion of the third video content to be displayed. The method may further include combining the selected portion of the first video signal, the selected portion of the second video signal, and the selected portion of the third video signal into a second composite video signal. The method may also include outputting the second composite video signal for display. The method may further include displaying the second composite video signal.

These and other novel features of the subject matter of the present application, as well as details of illustrated embodiments thereof, will be more fully understood from the following description and drawings.

DETAILED DESCRIPTION

Figure 1:
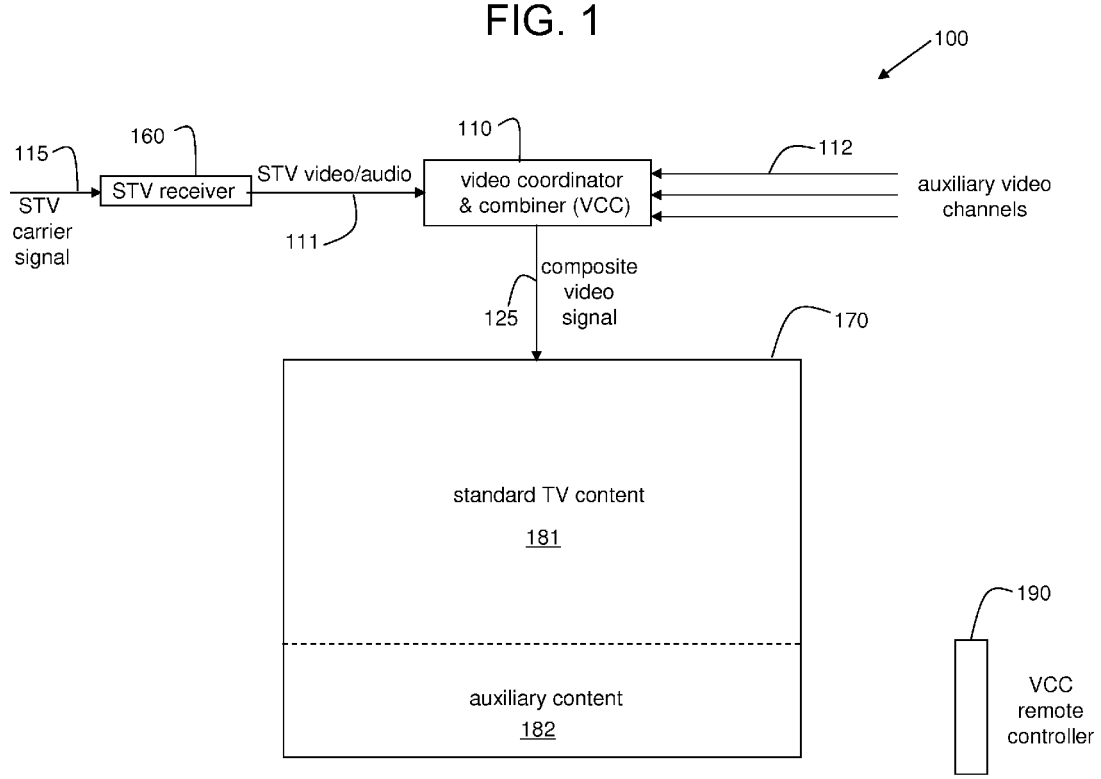
FIG. 1 illustrates a schematic block diagram of a system having a first embodiment of a video coordinator and combiner (VCC) apparatus for generating coordinated video content for display, and showing a first example embodiment of a coordinated video display partition or format.

FIG. 1 illustrates a schematic block diagram of a system 100 having a first embodiment of a video coordinator and combiner (VCC) apparatus 110 for generating coordinated video content for display, and showing a first example embodiment of a coordinated video display partition or format. In the system 100, the VCC 110 receives a standard television (STV) video signal 111 (along with audio) from a STV receiver 160 which converts a STV carrier signal 115 into the STV video signal 111. The STV carrier signal 115 may be from a first source such as a cable TV source, a satellite TV source, or an over-the-air broadcast TV source, for example. Similarly, the VCC 110 receives at least one auxiliary video signal 112 from at least one auxiliary video source (i.e., a second source such as, for example, a personal computer) over an auxiliary video channel. As such, the second source is independent of the first source. The VCC 110 is operatively connected to a video display 170 (e.g., a television set having a television screen or a video monitor) which receives a single composite video signal 125 from the VCC 110. The composite video signal 125 is a combination of a portion of the STV video signal 111 and a portion of the auxiliary video signal 112. FIG. 1 shows an example of where, on the video display 170, the standard TV content 181 from the portion of the STV video signal 111 is displayed and where the auxiliary content 182 from the portion of the auxiliary video signal 112 is displayed (i.e., a partition of video display real estate between standard TV content and auxiliary content).

For example, as shown in FIG. 1, the standard TV content 181 may be from a television comedy show broadcast on a particular television channel, and the auxiliary content 182 may be from a sports web page on the internet, via a personal computer (PC) and web browser, showing various updated sports scores. As shown in FIG. 1, the standard TV content 181 uses most of the video display 170, and the auxiliary content 182 uses a lesser lower portion of the video display 170. As a result, a user, having a personal computer (PC) operatively connected to the VCC 110 may easily keep up with current sports scores (e.g., football scores) while watching the comedy show.

As is described in detail later herein, the portion of the STV video signal 111 corresponding to a desired portion of the STV video content 181, and the portion of the auxiliary video signal 112 corresponding to a desired portion of the auxiliary video content 182 are selectable by a user using a VCC remote controller 190 which interacts with the VCC 110. The VCC remote controller 190 is also used to select where on the video display 170 the video content will appear.

Figure 2:
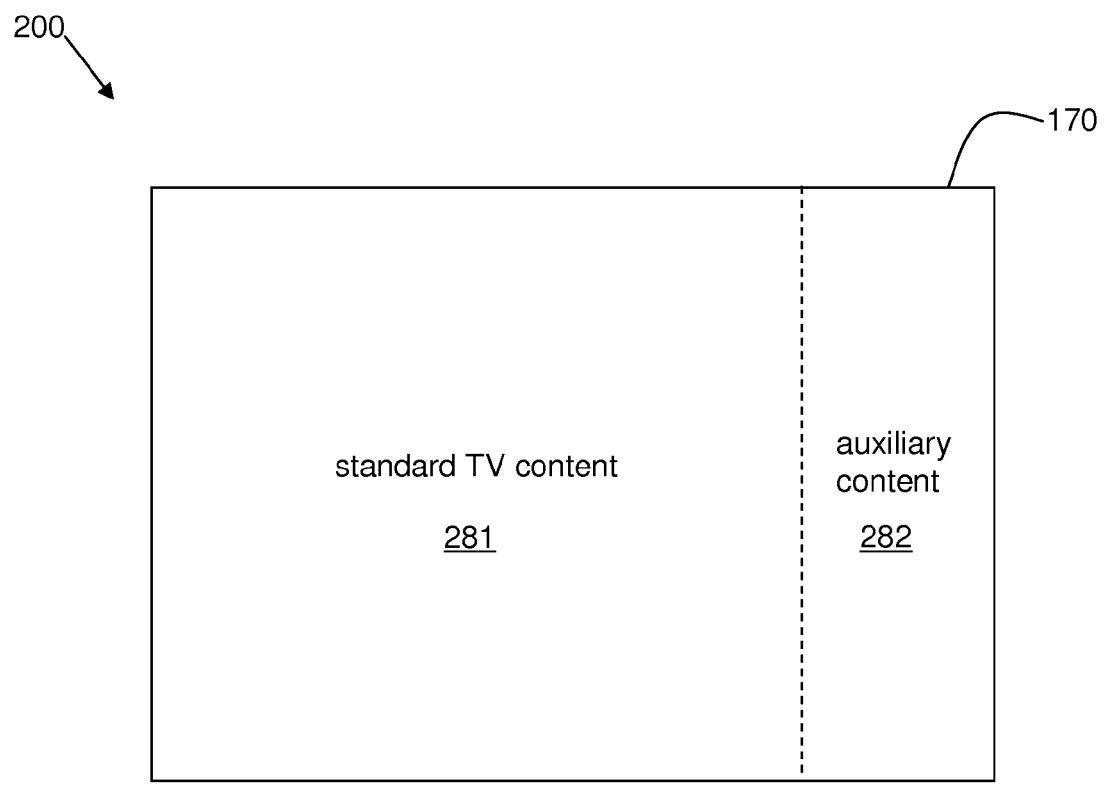
FIG. 2 illustrates a second example embodiment of a coordinated video display partition or format.

The partition of video display real estate between standard TV content and auxiliary content shown in FIG. 1 is just one possible example. FIG. 2 illustrates a second example embodiment of a coordinated video display partition or format 200. In FIG. 2, the standard TV content 281 is shown to the left of the auxiliary content 282 on the video display 170. The standard TV content 281 uses most of the video display 170 and the auxiliary content 282 uses a lesser right hand portion of the video display 170, as shown in FIG. 2. For example, the standard TV content 281 may be from a television news broadcast on a particular television channel, and the auxiliary content 282 may be from a software application running on a personal computer (PC) showing a calendar with various task due dates.

Figure 3:
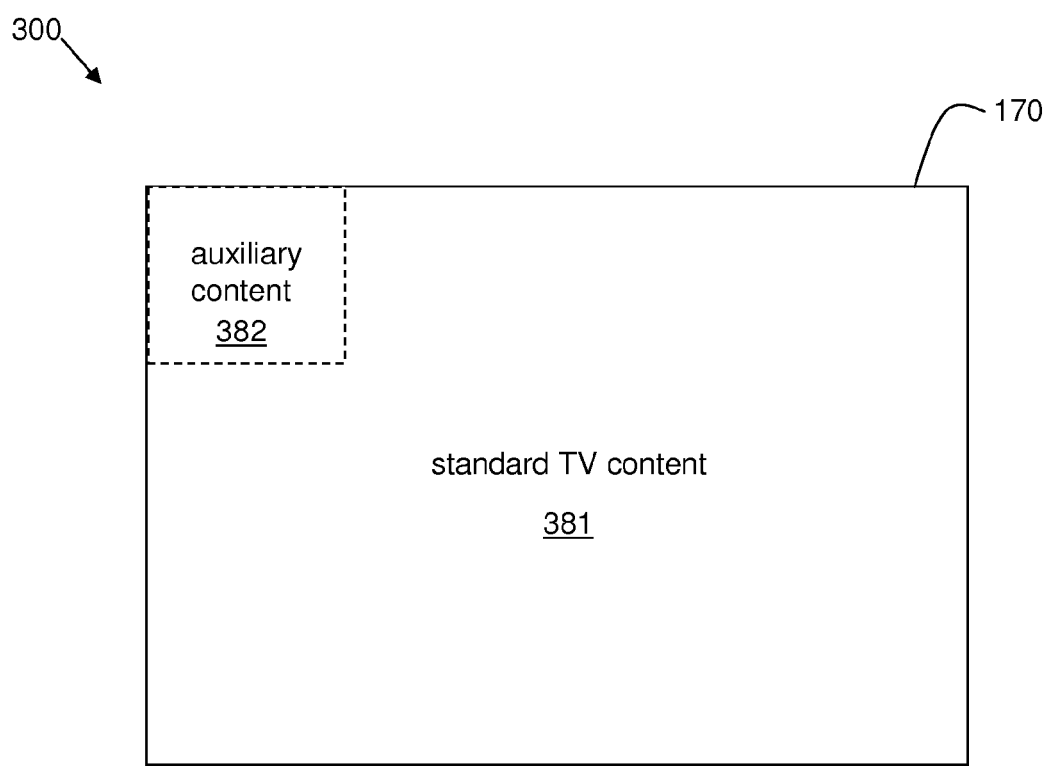
FIG. 3 illustrates a third example embodiment of a coordinated video display partition or format.

FIG. 3 illustrates a third example embodiment of a coordinated video display partition or format 300. In FIG. 3, the auxiliary content 382 is shown occupying an upper left region of the video display 170 and the standard TV content 381 occupies the rest of the video display 170. The standard TV content 381 uses most of the video display 170 and the auxiliary content 382 uses a lesser upper left portion of the video display 170, as shown in FIG. 3. For example, the standard TV content 381 may be from a television game show broadcast on a particular television channel, and the auxiliary content 382 may be from a financial web page on the internet, via a personal computer (PC) and web browser, showing a stock chart in near real time.

Figure 4:
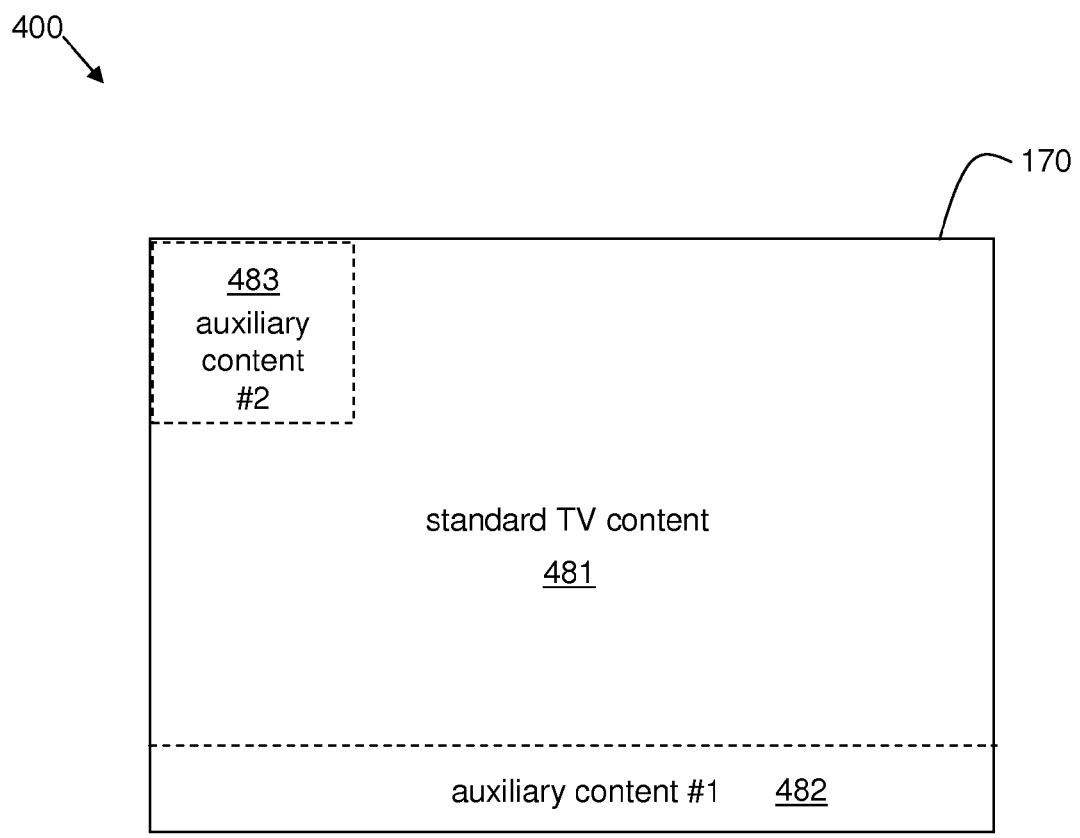
FIG. 4 illustrates a fourth example embodiment of a coordinated video display partition or format.

FIG. 4 illustrates a fourth example embodiment of a coordinated video display partition or format 400. In FIG. 4, two auxiliary contents are shown instead of just one. The auxiliary content #2, 483, is shown occupying an upper left region of the video display 170. The auxiliary content #1, 482, is shown occupying a lower region of the video display 170. The standard TV content 481 occupies the remaining portion of the video display 170. The standard TV content 481 uses most of the video display 170 whereas and the auxiliary content 483 uses a lesser upper left portion of the video display 170 and the auxiliary content 482 uses a lesser lower portion of the video display 170, as shown in FIG. 4. For example, the standard TV content 481 may be from a movie on a DVD, the auxiliary content 482 may be from a financial web page on the internet, via a personal computer (PC) and web browser, showing stock prices in near real time running across the bottom of the screen 170, and the auxiliary content 483 may be from a software application running on a personal computer (PC) showing an email inbox folder. As such, all three sources of video content are independent of each other. This is different from a picture-in-picture (PIP) implementation where, for example, a first video content and a second video content are from the same source (e.g., a television receiver).

Figure 5:
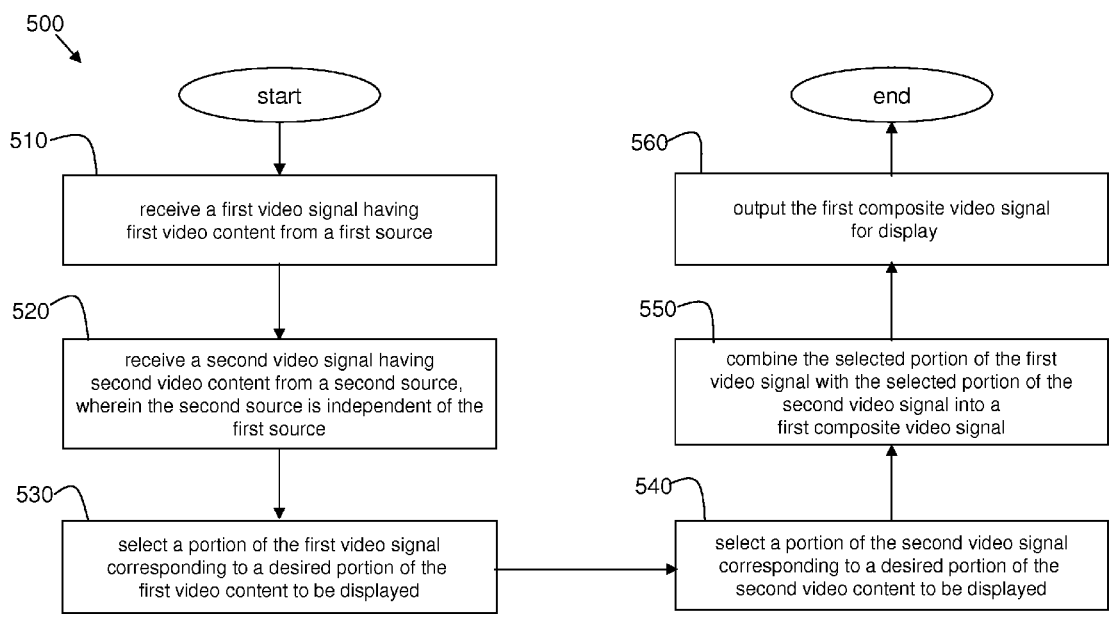
FIG. 5 is a flowchart of a first embodiment of a method for generating coordinated video content for display using the VCC of FIG. 1.

FIG. 5 is a flowchart of a first embodiment of a method 500 for generating coordinated video content for display using the VCC 110 of FIG. 1. In step 510, receive a first video signal (e.g., 111) having first video content (e.g., a broadcast television show) from a first source. In step 520, receive a second video signal (e.g., 112) having second video content (e.g., an internet web page) from a second source, wherein the second source is independent of the first source (i.e., the first video content and the second video content are from two different sources such as, for example, a STV receiver 160 and a PC).

In step 530, select a portion of the first video signal corresponding to a desired portion of the first video content to be displayed (e.g., 181). In step 540, select a portion of the second video signal corresponding to a desired portion of the second video content to be displayed (e.g., 182). Again, selecting the portion of the first video signal corresponding to a desired portion of the first video content, and selecting the portion of the second or auxiliary video signal corresponding to a desired portion of the second video content are described in detail later herein in the context of a user using a VCC remote controller 190 which interacts with the VCC 110. The VCC remote controller 190 is also used to select where on the video display 170 the video content will appear.

In step 550, combine the selected portion of the first video signal with the selected portion of the second video signal into a first composite video signal (e.g., 125). The composite video signal is a single video signal having encoded thereon the selected portion of the first video content and the selected portion of the second video content. In accordance with an embodiment of the present invention, the selected portions of the video contents are encoded into the composite video signal such that displayed frames of the composite video signal position the video contents in the desired selected locations on the video display 170 (e.g., in left/right relation as shown in FIG. 2, or in up/down relation as shown in FIG. 1). In step 560, output the first composite video signal (e.g., 125) for display (e.g., to the video display 170).

Figure 6:
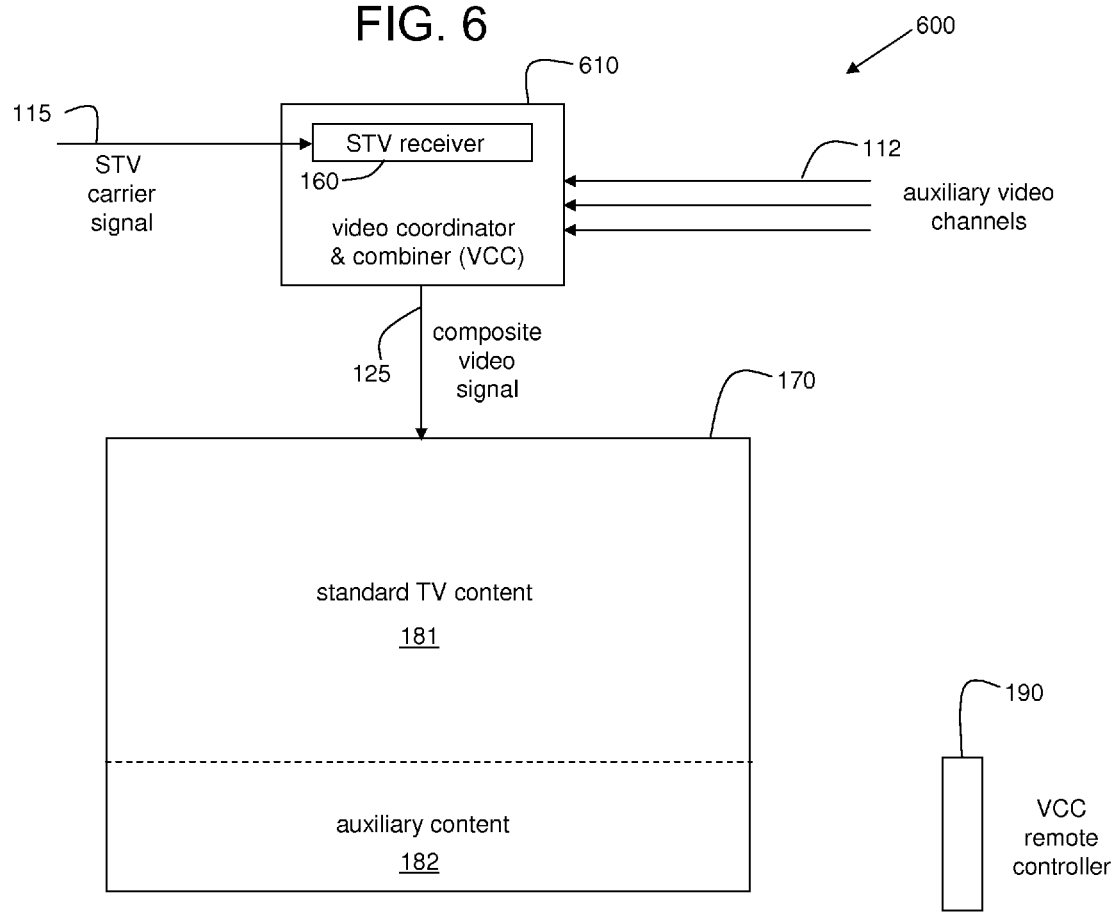
FIG. 6 illustrates a schematic block diagram of a system having a second embodiment of a video coordinator and combiner (VCC) apparatus for generating coordinated video content for display.

Other system configurations having a VCC, other than that of FIG. 1, are possible as well in accordance with various embodiments of the present invention. For example, FIG. 6 illustrates a schematic block diagram of a system 600 having a second embodiment of a video coordinator and combiner (VCC) apparatus 610 for generating coordinated video content for display. The system 600 is very similar to the system 100 of FIG. 1 except that, in this embodiment, the functionality of the STV receiver 160 is integrated into the VCC 610. Therefore, the STV carrier signal 115 is directly received by the VCC 610 and the STV video signal 111 is generated within the VCC 610 by the STV receiver 160.

Figure 7:
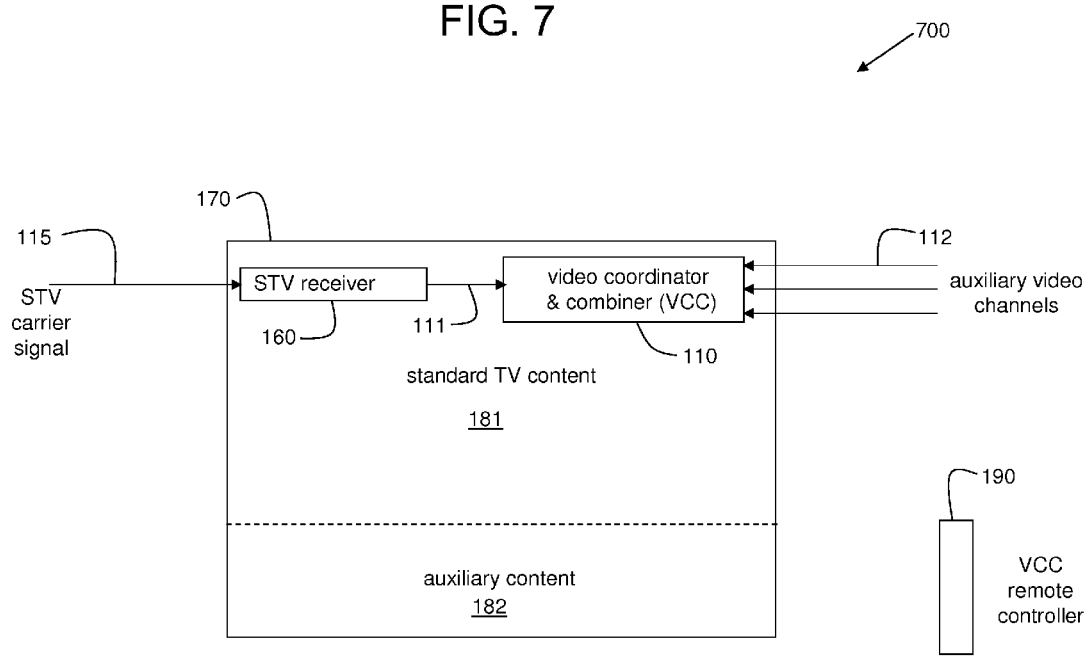
FIG. 7 illustrates a schematic block diagram of a system having a third embodiment of a video coordinator and combiner (VCC) apparatus for generating coordinated video content for display.

FIG. 7 illustrates a schematic block diagram of a system 700 having a third embodiment of a video coordinator and combiner (VCC) apparatus 110 for generating coordinated video content for display. The system 700 is somewhat similar to the system 100 of FIG. 1 and the system 600 of FIG. 6 except that, in this embodiment, the functionality of the STV receiver 160 and the VCC 110 are integrated into the television set 170. Therefore, the STV carrier signal 115 and the auxiliary video signal 112 are directly received by the television set 170. The STV video signal 111 and the composite video signal 125 are generated by the STV receiver 160 and the VCC 110, respectively, within the television set 170.

Figure 8:
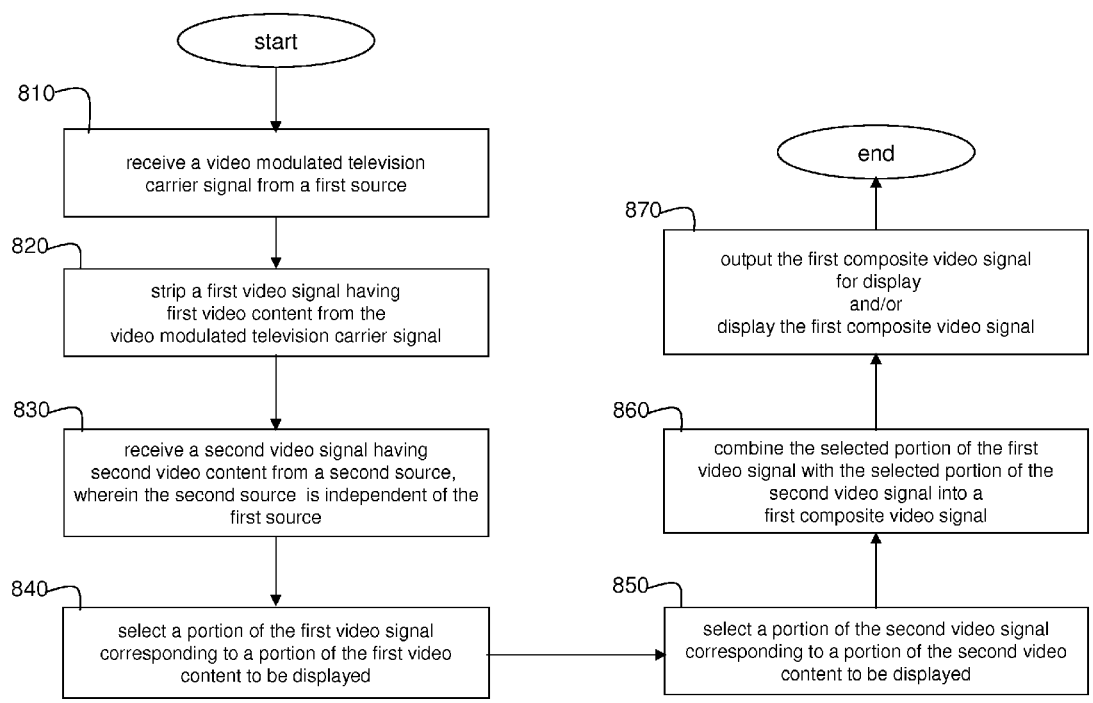
FIG. 8 is a flowchart of a second embodiment of a method for generating coordinated video content for display using, for example, the system of FIG. 6 or the system of FIG. 7.

FIG. 8 is a flowchart of a second embodiment of a method 800 for generating coordinated video content for display using, for example, the system of FIG. 6 or the system of FIG. 7. In step 810, receive a video modulated television carrier signal (e.g., 115) from a first source. In step 820, strip a first video signal (e.g., 111) having first video content from the video modulated television carrier signal. In step 830, receive a second video signal (e.g., 112) having second video content from a second source, wherein the second source is independent of the first source.

In step 840, select a portion of the first video signal corresponding to a portion of the first video content to be displayed (e.g., 181). In step 850, select a portion of the second video signal corresponding to a portion of the second video content to be displayed (e.g., 182). Again, selecting the portion of the first video signal corresponding to a desired portion of the first video content, and selecting the portion of the second or auxiliary video signal corresponding to a desired portion of the second video content are described in detail later herein in the context of a user using a VCC remote controller 190 which interacts with the VCC 110. The VCC remote controller 190 is also used to select where on the video display 170 the video content will appear.

In step 860, combine the selected portion of the first video signal with the selected portion of the second video signal into a first composite video signal (e.g., 125). In step 870, output the first composite video signal for display and/or display the first composite video signal.

Figure 9:
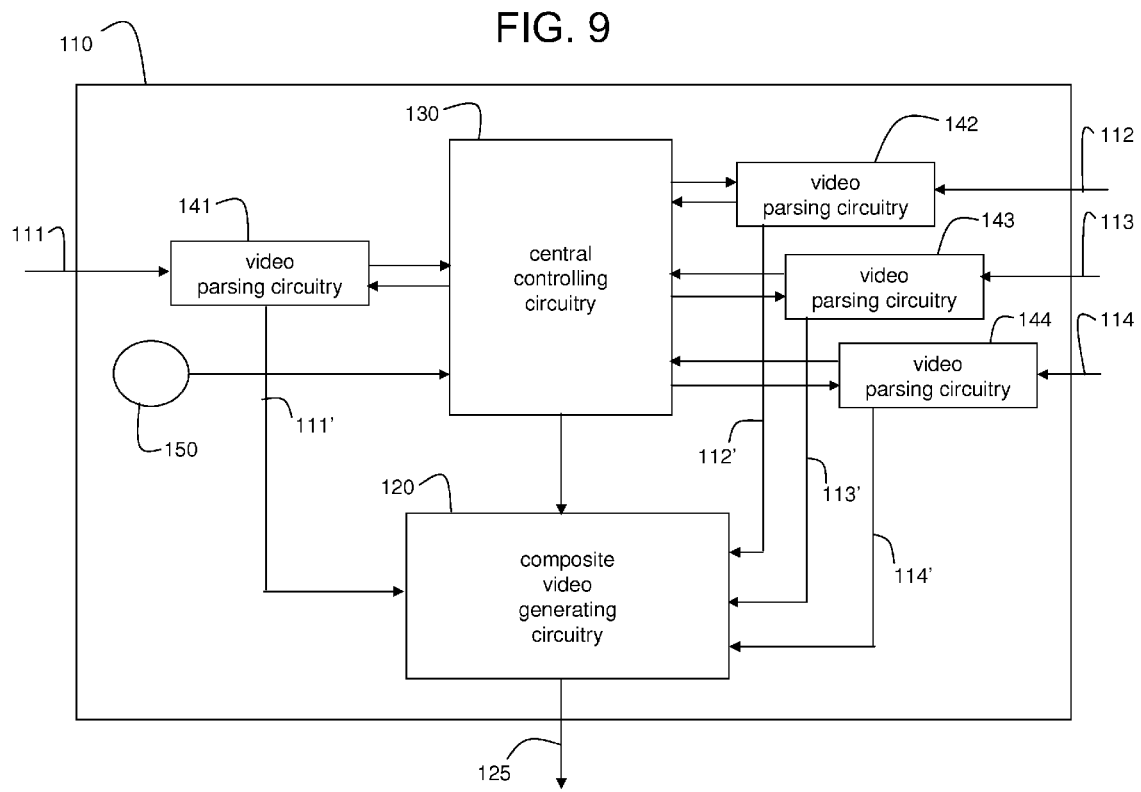
FIG. 9 illustrates a schematic block diagram of an embodiment of the VCC of FIG. 1.

FIG. 9 illustrates a schematic block diagram of an embodiment of the VCC 110 of FIG. 1. The VCC 110 includes composite video generating circuitry 120 operatively connected to central controlling circuitry 130. The VCC 110 further includes a plurality of video parsing circuitry 141-144 operatively connected to the composite video generating circuitry 120 and the central controlling circuitry 130. The VCC 110 also includes a remote command sensor 150 operatively connected to the central controlling circuitry 130. The central controlling circuitry 130, video parsing circuitry 141-144, and composite video generating circuitry 120 include various types of digital and/or analog electronic chips and components which are well known in the art, and which are combined and programmed in a particular manner for performing the various functions described herein. Furthermore, the particular design of the video parsing circuitry 141-144, the composite video generating circuitry 120, and the central controlling circuitry 130 may depend on the type of video to be processed (e.g., analog video or digital video) and the particular video format (e.g., RS-170, CCIR, RS-422, or LVDS). However, in accordance with a particular embodiment of the present invention, the video parsing circuitry, the composite video generating circuitry, and the central controlling circuitry are designed to accommodate a plurality of analog and digital video formats.

The remote command sensor 150 is capable of wirelessly (or via wired means) receiving commands (e.g., via electrical, optical, infrared, or radio frequency means) from the VCC remote controller 190 as operated by a user, and passing those commands on to the central controlling circuitry 130. The technologies for configuring such a remote command sensor 150 and controller 190 are well known in the art. The central controlling circuitry 130 is the main controller and processor of the VCC 110 and, in accordance with an embodiment of the present invention, includes a programmable microprocessor and associated circuitry for operatively interacting with the video parsing circuitry 141-144, the composite video generating circuitry 120, and the remote command sensor 150 for receiving commands, processing commands, and outputting commands.

The video parsing circuitry 141-144 each are capable of receiving an external video signal (e.g., 111-114), extracting a selected portion of video content from the video signal (i.e., parsing the video signal) according to commands from the central controlling circuitry 130, and passing the extracted (parsed) video content (e.g., 111'-114') on to the composite video generating circuitry 120. In accordance with an embodiment of the present invention, the video parsing circuitry 141-144 includes sample and hold circuitry, analog-to-digital conversion circuitry, and a programmable video processor. The composite video generating circuitry 120 is capable of accepting the parsed video content (e.g., 111'-114') from the video parsing circuitry 141-144 and combining the parsed signals into a single composite video signal 125 according to commands received from the central controlling circuitry 130. In accordance with an embodiment of the present invention, the composite video generating circuitry 120 includes a programmable video processor and digital-to-analog conversion circuitry.

In accordance with an embodiment of the present invention, parsing a video signal involves extracting video content from a same portion of successive video frames from a video signal. A frame of a video signal typically includes multiple horizontal lines of video data or content and one or more fields (e.g., interlaced video) along with sync signals (for analog video) or clock and enable signals (for digital video). The portion of the video frames to be extracted is selected by a user using the VCC remote controller 190 while viewing the full video content (i.e., full video frames) on the video display 170.

As an example, referring to FIG. 1, a user sends a video channel select command from the VCC remote controller 190 to the VCC 110 to display an auxiliary video signal 112 (e.g., from a PC) having auxiliary video content on the video display 170. Referring to FIG. 9, the command from the controller 190 is received by the sensor 150 of the VCC 110 and is sent to the central controlling circuitry 130. The central controlling circuitry 130 processes the command and directs the video parsing circuitry 142 to pass the entire (unparsed) video content of the video signal 112 to the composite video generating circuitry. The central controlling circuitry 130 also directs the composite video generating circuitry 120 to output the entire (unparsed) video content of the video signal 112 in the composite video signal 125. Therefore, the full auxiliary video content of the video signal 112 is displayed on the video display 170 via the composite video signal 125.

Figure 10:
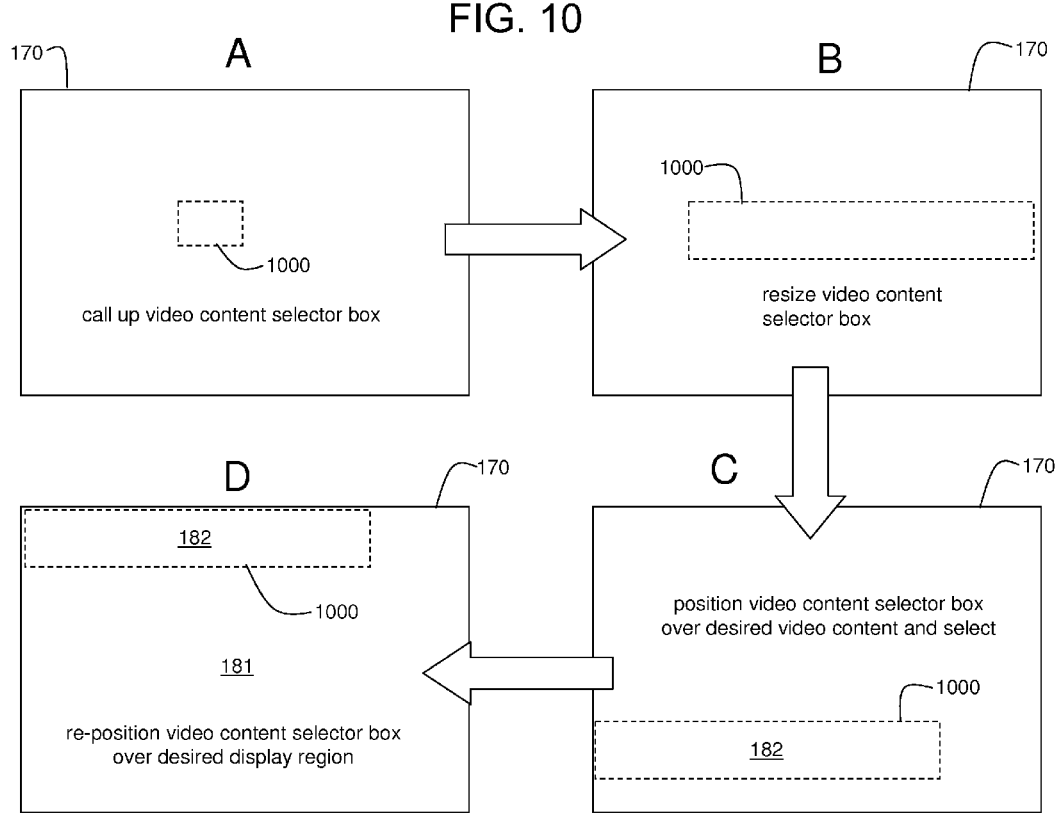
FIG. 10 illustrates an embodiment of a method of selecting a portion of an auxiliary video content for display along with a standard television video content.

Next, referring to FIG. 10, the user sends a video content select command from the VCC remote controller 190 to the VCC 110 to call up and display a video content selector box 1000 on the video display 170, inserted in the displayed auxiliary video content (see FIG. 10A). Referring again to FIG. 9, the command from the controller 190 is received by the sensor 150 of the VCC 110 and is sent to the central controlling circuitry 130. The central controlling circuitry 130 processes the command and directs the composite video generating circuitry 120 to insert the video content selector box 1000 into the composite video signal 125 such that the video content selector box 1000 is displayed on the video display 170 overlaid on the full auxiliary video content in the composite video signal 125. Just the outline or border of the box 1000 is displayed and the portion of the auxiliary video content encapsulated or surrounded by the border of the box 1000 can be seen within the box 1000.

Continuing with the example, the user manipulates the controls on the remote controller 190 to re-size the video content selector box 1000 to a desired size (see FIG. 10B). As such, referring again to FIG. 9, commands from the controller 190 are received by the sensor 150 of the VCC 110 and are sent to the central controlling circuitry 130. The central controlling circuitry 130 processes the commands and directs the composite video generating circuitry 120 to re-size the video content selector box 1000 within the composite video signal 125 according to the commands. The user is able to easily see the result of the re-sizing on the video display 170 (see FIG. 10B). Again, the portion of the auxiliary video content surrounded by the border of the box 1000 can be seen within the box 1000.

The user then manipulates the controls on the remote controller 190 to position the video content selector box 1000 over the desired portion of the displayed auxiliary video content to be selected (see FIG. 10C.). Referring to FIG. 9, commands from the controller 190 are received by the sensor 150 of the VCC 110 and are sent to the central controlling circuitry 130. The central controlling circuitry 130 processes the commands and directs the composite video generating circuitry 120 to re-position the video content selector box 1000 within the composite video signal 125 according to the commands. The user is able to easily see the positioned box 1000 on the video display 170 (see FIG. 10C) surrounding the desired portion of the auxiliary video content (frame) to be selected and parsed.

The user then sends a video content portion set command, using the controller 190, to the VCC 110 telling the VCC 110 to lock in or select the video content portion within the box 1000. The selected video content portion 182 of the auxiliary video content is displayed within the box 1000, and the STV video content 181 is displayed on the remaining portion of the video display 170 not occupied by the box 1000. Referring to FIG. 9, the video content portion set command from the controller 190 is received by the sensor 150 of the VCC 110 and is sent to the central controlling circuitry 130. The central controlling circuitry 130 processes the command and directs the video parsing circuitry 141 to parse the STV video signal 111 to extract all of the video content from the frames of the STV video signal 111 except that portion corresponding to the current position of the box 1000 on the video display 170. Similarly, the central controlling circuitry 130 also directs the video parsing circuitry 142 to parse the auxiliary video signal 112 to extract the selected video content portion, corresponding to the box 1000, from the frames of the auxiliary video signal 112.

The central controlling circuitry 130 further directs the video parsing circuitry 141 and the video parsing circuitry 142 to send the parsed STV content data 111' and the parsed auxiliary content data 112', respectively, to the composite video generating circuitry 120. The composite video generating circuitry 120 generates a composite video signal 125 which includes the combined video content from the parsed STV content data 111' and the parsed auxiliary content data 112', based on the current position of the box 1000 on the video display 170 as provided by the central controlling circuitry 130.

When parsing a video signal, the video parsing circuitry uses the selector box information provided by the central controlling circuitry 130 to determine which portions of which successive horizontal lines of video frames are to be extracted from the video signal. The corresponding portion of the video signal is sampled and extracted and sent to the composite video generating circuitry 120, for each frame (and/or field) of video, as parsed content data. The term "parsed content data" as used herein refers to sampled digital or analog video signal data that is sent to the composite video generating circuitry to be re-formatted as a true composite video signal.

Figure 11:
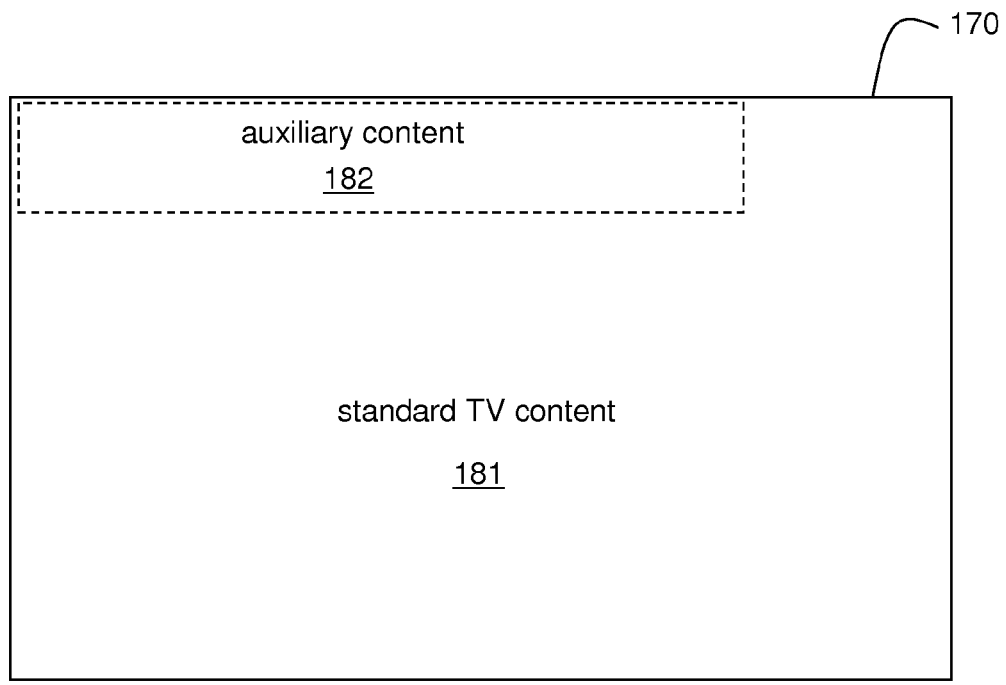
FIG. 11 illustrates a video display having a selected auxiliary video content portion, and the remaining portion of the video display having a standard television video content portion as a result of the method of FIG. 10.

The user may then manipulate the controls on the remote controller 190 to re-position the video content selector box 1000 over a desired auxiliary display region (e.g., upper left) on the video display 170 (see FIG. 10D). Referring to FIG. 9, the re-positioning commands from the controller 190 are received by the sensor 150 of the VCC 110 and are sent to the central controlling circuitry 130. The central controlling circuitry 130 processes the commands and directs the composite video generating circuitry 120 to re-position the video content selector box 1000 within the composite video signal 125 according to the commands. The user is able to easily see the re-positioned box 1000 on the video display 170 having the selected auxiliary video content portion 182, and the remaining portion of the video display 170 having the STV video content portion 181 as shown in FIG. 11. In accordance with an embodiment of the present invention, audio from the standard television signal is passed through to the television set 170.

As discussed above with respect to FIG. 4, additional auxiliary video signals from other independent auxiliary video sources may be received by the VCC 110 and content portions thereof incorporated into the composite video signal 125 in accordance with the methods described herein. In general, a user of the VCC 110 has the ability to select any combination of available video channels, and content portions thereof, to be incorporated into the composite video signal 125. Independent auxiliary video sources may include, for example, a personal computer (PC), a digital video recorder (DVR), a VCR player, another television receiver, and a DVD player. Other independent auxiliary video sources are possible as well.

In accordance with an alternative embodiment of the present invention, pre-defined video content selector boxes having pre-defined sizes and display positions may be provided in the VCC. For example, instead of having to manually re-size and re-position the video content selector box, when a user uses the VCC remote controller to send a video content select command from the VCC remote controller 190 to the VCC 110 to call up and display a video content selector box 1000 on the video display 170, the video content selector box 1000 may instead automatically appear on the display 170 at the desired size and over the desired portion of the displayed auxiliary video content.

In such an alternative embodiment, the central controlling circuitry 130 knows which video source the auxiliary video is derived from (e.g., due to communication with the video parsing circuitry) and selects an appropriately matched pre-defined box 1000 based on the known auxiliary video source. The pre-defined video content selector boxes may each be initially pre-defined and matched to a particular video source by a user. Then subsequently, whenever, the user selects a particular auxiliary video source to be combined with, for example, video from a STV video source, the corresponding pre-defined video content selector box is automatically incorporated into the composite video signal 125 and displayed at the proper location over the auxiliary video content. Such an embodiment saves the user several steps using the controller 190.

In summary, apparatus and methods for generating coordinated video content for display are disclosed. The apparatus takes video signals from independent sources and allows a user to select portions of the video signals, corresponding to desired portions of video content to be displayed, and combines those video signal portions into a single composite video signal. The composite video signal may be displayed, for example, on a television screen showing the desired portions of video content.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. An apparatus for generating coordinated video content for display, said apparatus comprising:
   (a) means for receiving a first video signal having first video content from a first source;
   (b) means for receiving a second video signal having second video content from a second source, wherein said second source is independent of said first source;
   (c) means for selecting a portion of said first video signal corresponding to a desired portion of said first video content to be displayed;
   (d) means for selecting a portion of said second video signal corresponding to a desired portion of said second video content to be displayed; and
   (e) means for combining said selected portion of said first video signal and said selected portion of said second video signal into a first composite video signal.

2. The apparatus of claim 1 further comprising means for outputting said first composite video signal for display.

3. The apparatus of claim 1 further comprising:
   (a) means for receiving a third video signal having third video content from a third source, wherein said third source is independent of said first source and said second source;
   (b) means for selecting a portion of said third video signal corresponding to a desired portion of said third video content to be displayed; and
   (c) means for combining said selected portion of said first video signal, said selected portion of said second video signal, and said selected portion of said third video signal into a second composite video signal.

4. The apparatus of claim 3 further comprising means for outputting said second composite video signal for display.

5. A method for generating coordinated video content for display, said method comprising:
   (a) receiving a first video signal having first video content from a first source;
   (b) receiving a second video signal having second video content from a second source, wherein said second source is independent of said first source;
   (c) selecting a portion of said first video signal corresponding to a desired portion of said first video content to be displayed;
   (d) selecting a portion of said second video signal corresponding to a desired portion of said second video content to be displayed; and
   (e) combining said selected portion of said first video signal and said selected portion of said second video signal into a first composite video signal.

6. The method of claim 5 further comprising outputting said first composite video signal for display.

7. The method of claim 5 further comprising:
   (a) receiving a third video signal having third video content from a third source, wherein said third source is independent of said first source and said second source;
   (b) selecting a portion of said third video signal corresponding to a desired portion of said third video content to be displayed; and
   (c) combining said selected portion of said first video signal, said selected portion of said second video signal, and said selected portion of said third video signal into a second composite video signal.

8. The method of claim 7 further comprising outputting said second composite video signal for display.

9. An apparatus for generating coordinated video content for display, said apparatus comprising:
   (a) means for receiving a video modulated television carrier signal from a first source;
   (b) means for stripping a first video signal having first video content from said video modulated television carrier signal;
   (c) means for receiving a second video signal having second video content from a second source, wherein said second source is independent of said first source;
   (d) means for selecting a portion of said first video signal corresponding to a desired portion of said first video content to be displayed;
   (e) means for selecting a portion of said second video signal corresponding to a desired portion of said second video content to be displayed; and
   (f) means for combining said selected portion of said first video signal and said selected portion of said second video signal into a first composite video signal.

10. The apparatus of claim 9 further comprising means for outputting said first composite video signal for display.

11. The apparatus of claim 9 further comprising:
    (a) means for receiving a third video signal having third video content from a third source, wherein said third source is independent of said first source and said second source;
    (b) means for selecting a portion of said third video signal corresponding to a desired portion of said third video content to be displayed; and
    (c) means for combining said selected portion of said first video signal, said selected portion of said second video signal, and said selected portion of said third video signal into a second composite video signal.

12. The apparatus of claim 11 further comprising means for outputting said second composite video signal for display.

13. The apparatus of claim 11 wherein said apparatus is a television set further comprising means for displaying said second composite video signal.

14. The apparatus of claim 9 wherein said apparatus is a television set further comprising means for displaying said first composite video signal.

15. A method for generating coordinated video content for display, said method comprising:
    (a) receiving a video modulated television carrier signal from a first source;
    (b) stripping a first video signal having first video content from said video modulated television carrier signal;
    (c) receiving a second video signal having second video content from a second source, wherein said second source is independent of said first source;
    (d) selecting a portion of said first video signal corresponding to a desired portion of said first video content to be displayed;
    (e) selecting a portion of said second video signal corresponding to a desired portion of said second video content to be displayed; and
    (f) combining said selected portion of said first video signal and said selected portion of said second video signal into a first composite video signal.

16. The method of claim 15 further comprising outputting said first composite video signal for display.

17. The method of claim 15 further comprising displaying said first composite video signal.

18. The method of claim 15 further comprising:
    (a) receiving a third video signal having third video content from a third source, wherein said third source is independent of said first source and said second source;
    (b) selecting a portion of said third video signal corresponding to a desired portion of said third video content to be displayed; and
    (c) combining said selected portion of said first video signal, said selected portion of said second video signal, and said selected portion of said third video signal into a second composite video signal.

19. The method of claim 18 further comprising outputting said second composite video signal for display.

20. The method of claim 18 further comprising displaying said second composite video signal.

* * * * *